United States Patent [19]

Jennelle

[11] Patent Number: 4,857,208
[45] Date of Patent: Aug. 15, 1989

[54] HYDRAULIC SWEEP CLARIFIER AND METHOD

[76] Inventor: Ernest M. Jennelle, 1711 Fox Run Ct., Vienna, Va. 22180

[21] Appl. No.: 241,954

[22] Filed: Sep. 8, 1988

Related U.S. Application Data

[62] Division of Ser. No. 49,408, May 14, 1987, Pat. No. 4,816,157.

[51] Int. Cl.$^4$ .............................................. B01D 21/32
[52] U.S. Cl. .................... 210/745; 210/802; 210/803
[58] Field of Search ............... 210/745, 800–804, 210/806, 521, 532.2, 532.1

[56] References Cited

U.S. PATENT DOCUMENTS

| | | | |
|---|---|---|---|
| 3,067,878 | 12/1962 | Genter et al. | 210/802 |
| 3,979,290 | 9/1976 | Löffler | 210/745 |
| 4,120,791 | 10/1978 | Wright | 210/802 |
| 4,681,683 | 7/1987 | Lindstol | 210/802 X |

Primary Examiner—Tom Wyse
Attorney, Agent, or Firm—Cushman, Darby & Cushman

[57] ABSTRACT

An apparatus and method for clarifying solids from a solids containing liquid having a multilayer baffle system and integral solids removal sump. The apparatus can have a variable speed impeller at its outlet so that an operator of the clarifier can control the flow rate therethrough to optimize efficiency.

The multilayer baffle system includes a first set of baffles placed above the main liquid flow path minimizes horizontal flow thereabove but creates local turbulence so as to promote efficient settling and assure no solids settle on the baffles. A second set of vertical flow interrupting baffles substantially eliminates upward turbulence created the first baffles and are shaped such that solids will not settle thereon. A third layer of baffles interrupts any horizontal flow component remaining in the clarifier so as to define a quiescent zone thereabove. Clarified liquid is removed from the surface of the quiescent zone.

3 Claims, 3 Drawing Sheets

HYDRAULIC SWEEP CLARIFIER AND METHOD

This is a division of application Ser. No. 49,408, filed May 14, 1987, U.S. Pat. No. 4,816,157.

BACKGROUND OF THE INVENTION

This invention relates to the clarification of liquids containing suspended solids.

Sewage and other waste water treatment facilities must be designed to clarify liquids which contain suspended solids. In order to do this efficiently, the designer of such facilities must balance a flow stream so as to obtain efficient settling, yet maximize throughput.

Improved efficiency in removing the settleable solids from a waste liquid stream can be used either to increase throughput or to decrease facility size for a given throughput. In either case, for even small efficiency increases, the dollar savings can be great over the lifetime of the facility.

The most common method for purifying domestic sewage and many industrial wastewaters is by employing the activated sludge process. This process consists of maintaining an environment that fosters a flocculant biological mass (activated sludge) that is capable of removing impurities from wastewater flow. The impurities are taken up by the activated sludge as a food source and accumulated as additional biological mass.

In order to accomplish the purification process, the biological mass must be capable of removing the impurities from the waste flow and the process must be designed and operated so as to maintain the activated sludge in a physiological state whereby it can effectively be removed from the wastewater flow by gravitational settling.

The activated sludge process is accomplished in two phases. The first is an activated sludge phase wherein the biological mass is mixed and aerated with the incoming wastewater (to form a mixed liquor) in a manner that will accomplish the uptake of impurities and maintain the proper physiological state of the biological mass. The second phase is a separation phase, whereby a quiescent low-turbulence condition is maintained to permit the gravitational settling of the biological mass. The clarified liquid is generally removed at the surface and then either subjected to further treatment or disinfected and discharged to surface waters without additional treatment.

The concentrated activated sludge is returned to the incoming flow. Since the uptake of the impurities as food results in biological growth, a portion of the concentrated sludge must be removed or "wasted" from the process. The efficiency of the treatment process depends on a high level of uptake of the impurities in the incoming flow by the biological mass and efficient separation of the biological mass from the treated liquid.

Solids separation is not only an expensive but also a difficult part of wastewater treatment. The separation phase is also often the principal source of both process and mechanical problems.

The conventional practice in activated sludge process design and operation has been to accomplish the activated sludge phase in a vessel wherein mixing and aeration is provided by diffused aeration. The mixed liquor is then piped to a second vessel where the separation phase is accomplished by gravitational consolidation of the solids under quiescent conditions. The settled solids are mechanically scraped to an outlet where they are returned to a point of mixing with the incoming sewage by pumping. The solids retention time in the separation phase generally amounts to several hours. During this period, the solids are neither fed or aerated. This results in a degeneration of the biological quality of the activated sludge and hence a reduction in efficiency of the treatment process.

Another process design employs velocity of flow for mixing and aeration. This modification is generally designed as an orbital configuration. There are several means employed for providing aeration and mixing in the orbital aeration tank. Each method involves the use of mechanical energy input to mix, aerate and maintain the orbital flow. The circuitous channel can be designed in various configurations including elongated or circular. Some modifications employ a pumping system or impeller to create the circuitous flow. Other designs employ a surface motor driven aerator having a vertical axis. The most common design employs an aerator having a horizontal axis normal to the direction of flow, with the aerator extending across the channel. In all cases the energy input is to impart momentum to the flow. All aeration systems in activated sludge processes employing an orbital flow pattern must impart sufficient velocity to the orbital flow to ensure good mixing of the biological solids with the incoming flow, to prevent deposition of the solids and to provide adequate oxygen transfer to the flow. Manufacturers and designers employ a plurality of aerator designs and the placement of the aerators in the aeration tank. Like the standard activated sludge process, the separation phase is generally accomplished in a separate clarification vessel.

More recently, designs wherein the mixing and aeration steps of the activated sludge process have been combined with the clarification step into a single unit have been proposed in order to minimize facility costs and improve efficiency.

One of these, the "intrachannel" clarifier, has been designed for example as disclosed in U.S. Pat. No. 4,303,516 to Stensel et al. In this patent it is taught to use an integral clarifier in an endless flowing circuitous channel, wherein a solids containing liquid stream is split, the first portion being allowed to enter the upstream end of the clarifier. The clarifier is, in essence, a basin within the outer channel. Outlets from the clarifier are formed along the bottom thereof so that solids which collect there can be scraped to the outlets and back into the second portion of the split stream which flows under the clarifier. Clarified liquid is removed from the surface of the interchannel clarifier.

While U.S. Pat. No. 4,303,516 provides an improvement by forming a clarifier integrally in an orbital flow stream, this design nevertheless provides no turbulence protection in the quiescent zone to ensure that the liquid being removed will not vary in quality when turbulence due to flow changes occurs at the clarifier inlet. Further, this design is not appropriate for use in a non-flowing environment, for example in a system where mixing and aeration occur by diffusing air into the liquid rather than achieving this by imparting flow to the liquid.

Improvements to the intrachannel clarifier are also described in Cerwick, U.S. Pat. Nos. 4,446,018 and Morrow, 4,455,239.

In U.S. Pat. Nos. 4,446,018, the solids scraping mechanism required in the clarifier of 4,303,516 is eliminated by replacing the flat bottom thereof with angled baffles, so that solids which settle in the integral clarifier will simply settle back into the main flow stream flowing underneath the clarifier. Inlet flow is once again directed into the "quiescent" zone from which clarified liquid is taken with minimal turbulence interruption within the clarifier itself. The design of U.S. Pat. No. 4,446,018 must also be used in flowing systems.

In U.S. Pat. No. 4,455,239 a further improvement is introduced whereby an intrachannel clarifier design is modified such that (1) it can be used in nonflowing systems since it has an integral impeller to impart sufficient momentum to the liquid to cause it to pass through the clarifier, and (2) the inlet stream to the clarifier is separated from the quiescent zone by a series of baffles, which, as in U.S. Pat. No. 4,446,018 form the bottom of the quiescent zone.

Even in light of these improvements, however, drawbacks remain in the design of these intrachannel clarifiers. In order to maximize clarifying efficiency, turbulence and horizontal liquid flow in the quiescent zone must be minimized. In early designs such as U.S. Pat. Nos. 4,303,516 and 4,446,018 no protection from flow variations and resulting turbulence is provided between the quiescent zone and the means to remove clarified liquid. In U.S. Pat. No. 4,455,239 the quiescent zone is isolated by a single layer of baffles which in and of themselves create turbulence as liquid passes from the main flow channel into the quiescent zone. Thus, while horizontal flow is decreased by the baffles, turbulence is created and settling efficiency lost.

Furthermore, the upper face of the baffles is so near to being horizontal that solids accumulate on the baffles where they decompose and rise to the surface as floating masses, interfering with clarification and creating an unsightly condition.

In all solids separation processes, there must be a consolidation of solids in the lower part of the clarifier. In designs where the clarification is accomplished in a separate vessel, considerable depth must be provided for the consolidation of the solids. Previous intra-channel clarifiers have been relatively shallow and without provisions in the design to overcome the deficiency in solids consolidation depth. This reduces clarification efficiency.

In the U.S. Pat. No. 4,455,239 design, flow through the integral clarifier must be maintained at a sufficient rate to ensure that no solids settle in the clarifier itself. If this flow could be controlled, settling efficiency could be even further enhanced. In all of these designs, no provision is made for responding to changes in solids concentration and settleability at the clarifier inlet. It would be advantageous if variations in feed solids concentration and quality to the clarifier could be better managed in order to optimize solids separation at various process conditions.

Thus, it is an object of the invention to improve the solids separation settling efficiency of an intrachannel clarifier by designing a unit through which controlled flow rates can be achieved, which design provides a baffle arrangement and operator controlled turbulence, whereby solids can be rapidly returned to the underflow, minimizing the depth requirements for solids consolidation. The design also provides for minimizing both horizontal and vertical turbulence within the quiescent zone, and for the concentrating of solids to be wasted from the process.

SUMMARY OF THE INVENTION

In accordance with the invention, a method is provided for improving the separation efficiency of solids in an intrachannel clarifier which comprises at least one horizontal-vertical-horizontal liquid flow diversion zone comprising a lower horizontal flow interrupting area, an intermediate vertical flow diverting and turbulance dissipating area where the solids are rapidly swept back into the underflow through controlled mass transfer, and an upper horizontal flow interrupting area sequentially interrupting the horizontal flow by dividing the clarification section into cells whereby the energy differential across a cell is minimal.

In this method the turbulance created in a lower horizontal flow interrupting area is diverted at least partially transversely from the vertical so as to dissipate turbulence and slow vertical flow and allow additional settling of solids and transfer solids back into the flow channel.

In accordance with another embodiment of the invention, an apparatus is provided in an intrachannel clarifier having a multilayer baffle system for interrupting horizontal and vertical flow at an intermediate level of the clarifier comprising first baffle means (in a lower portion of said clarifier) for interrupting horizontal flow through the clarifier, turbulence interrupting means positioned above said baffle means shaped so as to divert turbulence at least partially transversely from the vertical, and second baffle means positioned above the turbulence interrupting means for interrupting horizontal flow in an upper portion of said clarifier.

In its most preferred embodiment the invention comprises an apparatus for clarifying a solids containing liquid flowing through the apparatus, made up of first means for containing the liquid, the first means being made up of a pair of end walls, a pair of side walls and a bottom, the end walls having inlet and outlet openings therein;

second means comprising a plurality of first baffle members spaced along the length of the first means, for interrupting horizontal flow through the first means, the baffle members being disposed at a uniform distance above the bottom wall of the first means, and extending from side wall to side wall therein;

the space between the second means and the bottom of the first means defining a turbulent horizontal flow path from inlet to outlet;

third means for interrupting vertical turbulence disposed above the second baffle means and made up of a plurality of turbulence interrupting members, which members are shaped so as to divert turbulence at least partially transversely from the vertical;

fourth means for interrupting horizontal flow, disposed above the third means and defining a quiescent zone thereabove, comprising a plurality of second baffle members spaced along the length of the first and extending from side to side thereof;

fifth means for removing clarified liquid from the quiescent zone disposed substantially adjacent the surface of the liquid in the first means.

In another embodiment, the bottom of the first means for containing liquid can have an integral solids concentrating means formed therein so as to concentrate solids for removal from the bottom of the apparatus. Further, a pump means may be used to cause flow through the apparatus, the pump means comprising a variable speed impeller which an operator of the apparatus can control the level of vertical mixing between the first and third means so as to more efficiently settle the solids back to the first means and minimize the need for solids consolidation.

In a preferred method, the apparatus described may be used in a method for clarifying liquids comprising the steps of:

creating a horizontally flowing turbulent liquid flow path in an area defined by two side walls, two end walls and a bottom, the liquid flowing from an inlet to an outlet formed in the end walls;

creating an at least partially upwardly flowing turbulent zone above the horizontal flow path by placing a plurality of spaced first baffle members therealong, and disposed at a uniform distance above said bottom, the baffle members being positioned and shaped so as to minimize horizontal liquid flow in said turbulent zone and to create a controlled mass transfer through turbulence in an area adjacent the spaced baffle members;

forming a first quiescent zone above the turbulent zone by placing a plurality of turbulence interrupting members above the first baffle members of the turbulent zone, the turbulence interrupting members being shaped so as to divert upward turbulence at least partially transversely from the vertical and shaped so as to minimize interruption of solids settling and transfer by turbulence through the first quiescent zone;

forming a second quiescent zone above said first quiescent zone by placing a plurality of spaced horizontal flow interrupting second baffle members above the first quiescent zone, the second baffle members being spaced along the length of the zone, and being spaced and shaped so as to minimize horizontal flow but not interrupt the settling of solids from said second quiescent zone;

removing clarified liquid from the top of said second quiescent zone.

Another embodiment of the novel method may further comprise the removal of concentrated solids from the bottom of the horizontal flow path, and may also include the step of varying the flow rate of liquid through the horizontal flow path based, for example, on the clarity of the clarified liquid so as to optimize the removal of solids from the incoming liquid.

DETAILED DESCRIPTION OF THE INVENTION

The invention will now be described with reference to the accompanying drawings showing the novel and inventive features of the hydraulic sweep clarifier.

Figure 1:
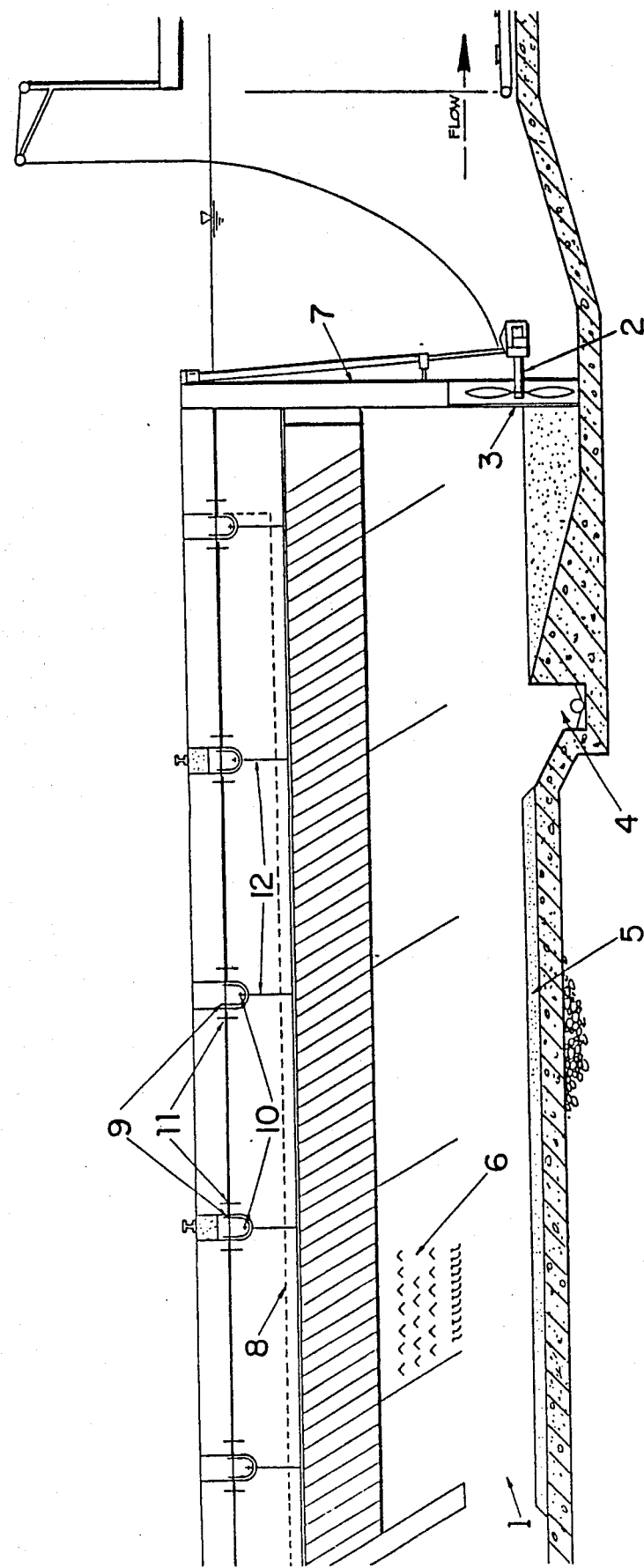
FIG. 1 is a section view showing the multi-layer baffle system, integral sump and variable speed impeller as positioned in the preferred embodiment of he hydraulic sweep clarifier.

In FIG. 1 a cross-section of the preferred embodiment of the hydraulic sweep clarifier is depicted. In this embodiment, a flow path of horizontally flowing turbulent liquid enters the clarifier at inlet 1. In this preferred embodiment flow through the clarifier is induced by the use of a variable speed impeller 2 at outlet 3. It should be noted however that flow through the clarifier can be induced in a number of different ways for example by flow inducing means not adjacent the clarifier but in the activated sludge phase. Flow may also be achieved by gravity feed.

In the bottom of the clarifier an integral solids concentrating sump 4 for the removal of solids is shown. The main horizontal turbulent flow path is thus defined between inlet 1, outlet 3, bottom 5 and baffle system 6.

Flow through the horizontal flow zone is controlled by varying the speed of impeller 2 such that solids do not collect along bottom 5, but rather are swept along the clarifier to solids concentrating sump 4 or to outlet 3.

As can be seen in FIG. 1, the entire clarifier basin itself is defined by bottom 5 and end walls 7 and side walls not shown in this view.

It will be appreciated that the baffle system 6 is designed to virtually eliminate horizontal flow and turbulence in the uppermost "quiescent" zone of the clarifier, designated 8.

Adjacent the surface of the liquid in the clarifier, overflow weirs 9 define outlet troughs 10 into which clarified liquid spills. Scum baffles 11 are positioned adjacent the wiers 9 to keep scum from entering troughs 10.

The portion of the main horizontally flowing stream leaving the clarifier through outlet 3 is returned to the influent end of the activated sludge phase of the facility in which the hydraulic sweep clarifier would normally be placed.

It may be noted that there will be a reduction in the hydraulic gradient from the influent end to the effluent end of the clarifier. This reduction in gradient is caused by energy loss from flow through the unit. The removal of flow at each of the surface troughs 10 and the reduction in hydraulic gradient promotes flow through the clarifier. The use of baffle systems 6 and 12, as further described below, ensures that turbulence and flow gradients in quiescent zone 8 are insignificant relative to flows elsewhere in the clarifier.

Scum removal baffles 11 can be mounted on a travelling bridge in a known manner.

The hydraulic sweep clarification operation of the invention takes mixed liquor from the activated sludge phase of a sewage treatment facility, clarifies it and returns the concentrated biological solids which leave the clarifier to where they are mixed with the incoming flow of the activated sludge phase. Large diameter, slow speed impellers 2 are used to maintain the hydraulic sweep of the solids containing liquid in the clarifier from the lower outlet 3 to the incoming flow of the activated sludge phase (not shown). It has been determined that flow through the inlet 1 should generally be maintained at from 0.25 to 0.75 feet per second. Solids retention time in the clarifier operation is only on the order of a few minutes.

It is essential that the upward movement of the clarified liquid be less than the settling rate of the biological solids to be removed in the clarifier and it is the horizontal-vertical-horizontal flow interrupting baffle system of the invention which allows this requirement to be met while at the same time achieving an increase in flow volume through the system. More importantly, the baffle arrangement together with the operator controlled turbulence provides for rapid transfer of the separated solids back into the flow of the first means, thus reducing the need for compaction depth in the clarifier.

To improve efficiency further, a transverse water tight baffle system 12 can be provided at each effluent trough to minimize velocity gradients through the clarification section. This design provides small compartments where the energy differential across a compartment is insignificant and additional wier length which reduces unit hydraulic wier loading.

In FIG. 1, impeller 2 and the associated motor of the preferred embodiment are supported and hinged to permit removal for maintenance without emptying the process vessel. Variable speed controls can be provided to permit an operator to control the intensity of hydraulic sweep and turbulence through the clarifier to achieve optimum operational efficiency. Variation in flow rate can be based on the level of turbulence in baffle system 6.

Figure 2:
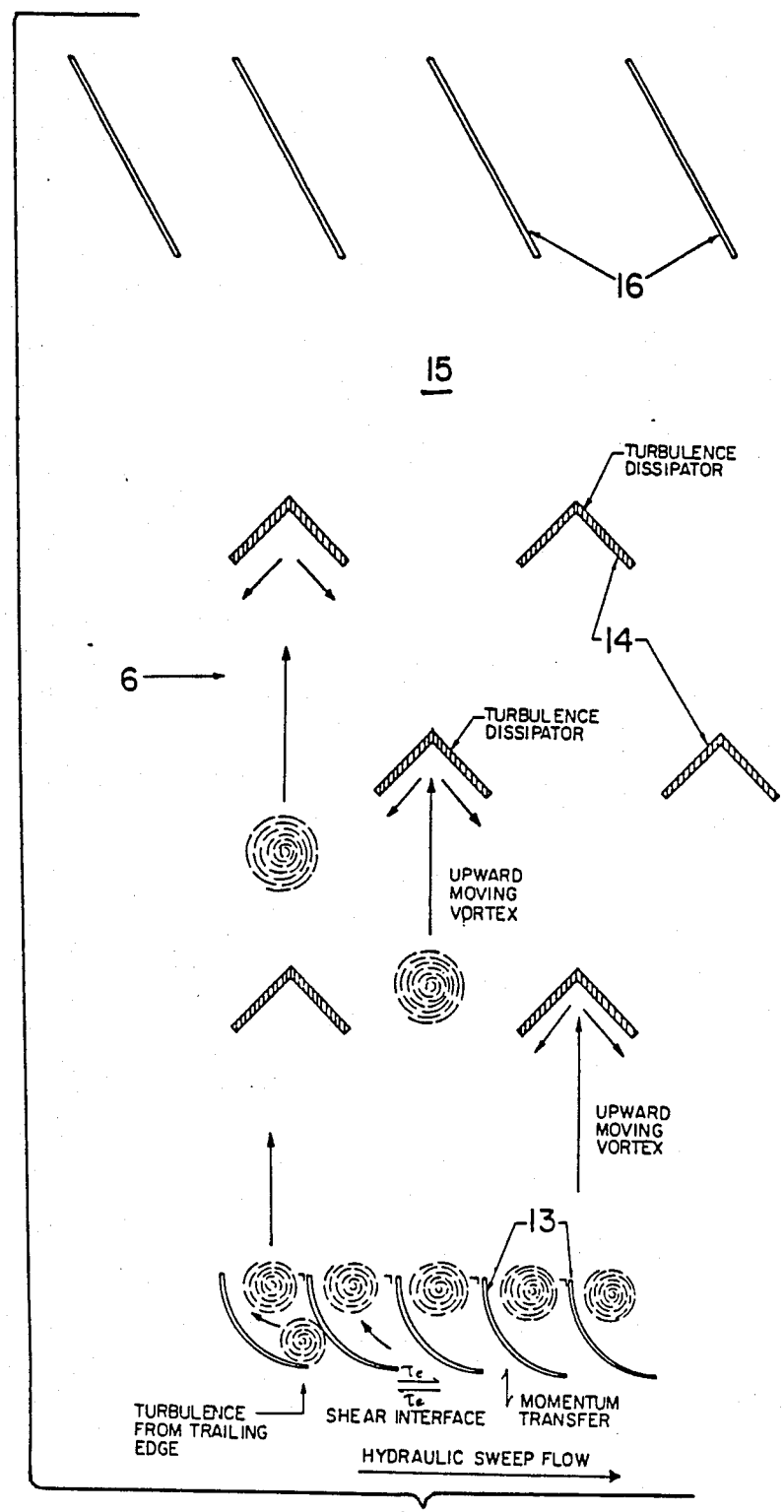
FIG. 2 is an enlarged, side elevation section view of the multi-layer baffle system of the invention.

In FIG. 2 baffle system 6 is shown in cross-section enlarged detail. At the bottom of the baffle system, defining the horizontally flowing turbulent stream below it is a first layer of baffles spaced along the length of the clarifier. In the preferred embodiment, quadrant baffles 13 are used as a barrier in order to minimize horizontal flow in the zone above them. Additionally, however, these baffles play an important role in reducing the amount of solids which would otherwise collect on the quadrant baffle 13 surfaces by creating upwardly moving vortices and thereby creating a turbulent zone immediately above and adjacent the quadrant baffles 13. Thus, by use of these quadrant baffles 13 a shear interface is created in which momentum is transferred vertically so as to carry liquid upwardly through baffle system 6.

Naturally, the upwardly moving vortices created by baffles 13 would likely decrease settling efficiency if used alone. However, when such baffles are used in combination with turbulence dissipators 14, upward movement of the liquid is achieved without creating undue turbulence in the quiescent zone 8 (not shown in FIG. 2) near the surface of the liquid in the clarifier.

The exact shape of the baffles 13 is not critical. For example, flat baffles could be used. It has been found, however, that the quadrant baffles 13 of the preferred embodiment produce the required upwardly moving turbulence, minimizing horizontal flow above the quadrant baffles 13, while still encouraging transfer of solids therebetween such that the solids are returned to the main horizontally flowing channel.

The turbulence dissipating members 14 likewise may be of various shapes, with a principal requirement being that the upper surface does not collect solids as the settling solids pass down through the baffle system. Generally, an inverted-V or inverted semi-circle will be the preferred cross-section shape for turbulence dissipating members 14.

The combination of quadrant baffles 13 and turbulence dissipating members 14 creates a first quiescent zone 15 the area of the clarifier immediately adjacent and above the turbulence dissipating members. Since solids settling through the first quiescent zone 15 will be subjected to the upwardly moving vortices as they fall and approach quadrant baffles 13, collection of solids around baffles 13 is minimized. Immediately above the first quiescent zone 15 is an additional array of spaced horizontal flow interrupting baffles 16.

In the preferred embodiment baffles 16 are elongated plate-like members positioned at a steep angle relative to the horizontal, and are elongated in the vertical direction so as to define a second quiescent zone 8 (FIG. 1) thereabove in which horizontal flow is further minimized. Once again, the particular shape of baffle members 16 is not critical except for the requirement that no horizontal or near-horizontal surface is presented upon which solids may settle and that, like all other baffles in the system, they extend across the clarifier from side wall to side wall.

Particular placement of the baffles and turbulence dissipating members relative to one another within the clarifier is important to the invention. Most importantly the multi-layer system must have a horizontal flow interrupter with a vertical turbulence dissipator above that, and a second horizontal flow interrupter above the vertical turbulence dissipator.

In the preferred embodiment the distance from the top of quadrant baffles 13 to the lowest turbulence dissipating member is 10"-12". The array of turbulence dissipating members 14 contains more than one horizontal row and these rows are spaced such that adjacent horizontal rows (in cross-section along the length of the clarifier) are staggered. Thus, the horizontal distance between the turbulence dissipating member in a row is on the order of 4", the same horizontal spacing being used for the adjacent horizontal row, but the adjacent row being offset so as to interrupt upward flow which passes between the dissipating members of the row below.

In the preferred embodiment three such rows are used with a vertical spacing between the rows of approximately 7". The vertical distance from the upper most turbulence dissipating member 14 to the upper horizontal flow interrupting baffle 16 is approximately 12". This area defines a first quiescent zone 15.

Baffle members 16 are elongated plates having a top to bottom length of about four feet.

Figure 3:
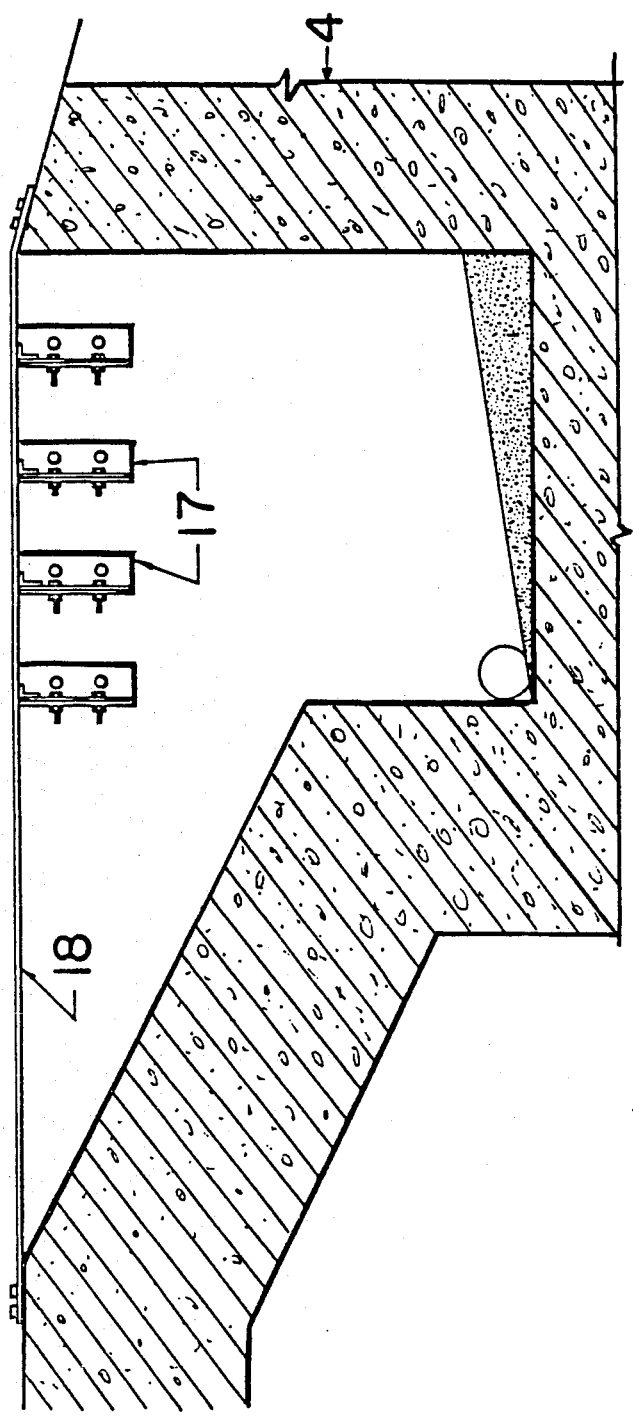
FIG. 3 is an enlarged, side section of the integral solids removal sump of the invention.

FIG. 3 shows an enlarged cross-sectional view of the solids concentrating sump 4 of the invention. It has been found that the use of such a sump integral with the intrachannel clarifier promotes efficiency of the overall system by reducing the volume of waste solids to be removed from the clarifier. By controlling the hydraulic sweep of solids, a more concentrated waste sludge can be achieved and lower flow rates can be used therein without fear of solids collecting on the bottom 5 of the clarifier. To further encourage solids settling at the sump 4, baffles 17 are positioned thereabove, held in place by straps 18.

By use of the special baffle system 6, including especially the combination of a lower layer of quadrant baffles 13 to minimize horizontal flow and create local turbulence, coupled with turbulence dissipating members 14 disposed above the quadrant baffles 13, it has been found that efficient settling can be achieved without solids collection on the baffles used. Additionally, the use of an integral sump in the hydraulic sweep clarifier improves efficiency even further. Finally, where a variable speed impeller is used the operator may optimize settling efficiency in the clarifier by adjusting the flow therethrough to control both the sweep along the bottom 5 and the level of turbulence in baffle section 6.

Although only one exemplary preferred embodiment of the present invention has been described in detail, those skilled in the art will recognize that many modifications and variations may be made in this embodiment while yet retaining the many novel features and advantages of this invention. Accordingly, all such variations and modifications are intended to be included within the scope of the appended claims.

What is claimed is:

1. Method of clarifying liquids from a solids containing liquid body comprising the steps of:

(1) creating a horizontally flowing turbulent liquid flow path in an area defined by two side walls, two end walls and a bottom, said liquid body flowing from an inlet to an outlet formed in the end walls;

(2) creating an at least partially upwardly flowing turbulent zone above said flowpath by placing a plurality of spaced first baffle members along said flow path and disposed at a uniform distance above said bottom, said baffle members being positioned and shaped so as to minimize horizontal liquid flow in said turbulent zone and to create turbulence in an area adjacent to said spaced baffle members;

(3) forming a first quiescent zone above said turbulent zone by placing a plurality of turbulence interrupting members above said first baffle members of the turbulent zone, said turbulence interrupting members being spaced and shaped so as to divert upward turbulence at least partially transversely from the vertical and shaped so as to minimize interruption of solids settling through the zone;

(4) forming a second quiescent zone above said first quiescent zone by placing a plurality of horizontal flow interrupting second baffle members above said first quiescent zone, the second baffle members being spaced along the length of said zone, and being shaped so as to minimize horizontal flow but not interrupt the settling of solids from said second quiescent zone;

(5) removing clarified liquid from the top of said second quiescent zone.

2. Method as in claim 1 further comprising the step of removing settled solids from a sump formed integrally in the bottom of said horizontal flow path.

3. Method as in claim 1 further comprising the step of varying the flow rate of liquid through said horizontal flow path by means of a controllable variable speed impeller positioned adjacent said outlet, based on the clarity of the clarified liquid being removed from said second quiescent zone.

* * * * *